(12) United States Patent
Mohan

(10) Patent No.: US 9,516,571 B2
(45) Date of Patent: Dec. 6, 2016

(54) METHODS AND APPARATUS FOR OPPORTUNISTIC SMALL CELL TRIGGERING

(71) Applicant: QUALCOMM Incorporated, San Diego, CA (US)

(72) Inventor: Siddharth Mohan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 14/173,675

(22) Filed: Feb. 5, 2014

(65) Prior Publication Data
US 2015/0223138 A1   Aug. 6, 2015

(51) Int. Cl.
*H04W 40/00* (2009.01)
*H04W 36/32* (2009.01)
*H04W 36/08* (2009.01)
*H04W 4/02* (2009.01)
*H04W 24/02* (2009.01)

(52) U.S. Cl.
CPC .............. *H04W 36/32* (2013.01); *H04W 4/02* (2013.01); *H04W 24/02* (2013.01); *H04W 36/08* (2013.01)

(58) Field of Classification Search
CPC .......................... H04W 84/045; H04W 36/00
USPC .................... 455/456.1, 431, 446, 449, 450, 426.1,455/424, 561, 522.1, 414.1, 524, 436, 422.1,455/444, 411; 370/328, 329, 254, 331, 277, 332
See application file for complete search history.

(56) References Cited

U.S. PATENT DOCUMENTS

| | | |
|---|---|---|
| 2006/0121904 A1 | 6/2006 | Reuhkala et al. |
| 2010/0331000 A1* | 12/2010 | Zhu ..................... H04W 36/245 455/444 |
| 2012/0033611 A1* | 2/2012 | Wu .............................. 370/328 |
| 2012/0094663 A1 | 4/2012 | Awoniyi et al. |
| 2012/0169535 A1 | 7/2012 | Kong et al. |
| 2012/0172082 A1 | 7/2012 | Abbadessa et al. |
| 2013/0065600 A1* | 3/2013 | Lim .............................. 455/450 |
| 2013/0189932 A1 | 7/2013 | Shen et al. |
| 2014/0242989 A1* | 8/2014 | Cai et al. ...................... 455/436 |
| 2015/0049649 A1* | 2/2015 | Zhu et al. ..................... 370/277 |
| 2015/0133091 A1* | 5/2015 | Baldwin ............. H04W 64/006 455/414.1 |

FOREIGN PATENT DOCUMENTS

| | | |
|---|---|---|
| EP | 2416608 A1 | 2/2012 |
| EP | 2 523 492 A1 | 11/2012 |
| WO | WO-2013037875 A1 | 3/2013 |

OTHER PUBLICATIONS

International Search Report and Written Opinion—PCT/US2015/013964—ISA/EPO—May 19, 2015, (12 pages).

(Continued)

*Primary Examiner* — Kiet Doan
(74) *Attorney, Agent, or Firm* — Arent Fox LLP

(57) ABSTRACT

Methods and apparatus are described for opportunistic small cell triggering. The methods and apparatus include determining, by a user equipment (UE) connected to a cell, a change of location of the UE. Further, the methods and apparatus include requesting small cell information from a database based at least in part on the change of location of the UE. Moreover, the methods and apparatus include attempting to detect a small cell based on the small cell information. Additionally, the methods and apparatus include transmitting a message to turn on the small cell when no the small cell is not detected.

24 Claims, 10 Drawing Sheets

(56) References Cited

OTHER PUBLICATIONS

Qualcomm Incorporated, "Small Cell Discovery", 3GPP Draft; R1-132494, 3GPP TSG-RAN WG1 #73, Fukuoka, Japan; May 20-24, 2013, XP050698212, 6 Pages. Retrieved from the Internet:URL:http ://www.3gpp.org/ftp/tsg_ran/WG 1_RL 1 /TSG R 1_73/Docs/.

* cited by examiner

METHODS AND APPARATUS FOR OPPORTUNISTIC SMALL CELL TRIGGERING

BACKGROUND

Aspects of the present disclosure relate generally to wireless communication, and more particularly, to methods and apparatus for opportunistic small cell triggering by a user equipment.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In some wireless communication networks, a user equipment (UE) selects and maintains a connection with a base station providing communication capabilities for the UE. Further, in such wireless communication systems, small cells (e.g., Home Node B) may be deployed to improve wireless network communications when experiencing poor base station connections. In such wireless communication networks, small cells may have lower transmit power so they may have smaller coverage area. As a result, there may be instances where the small cell will not have users within the coverage area. As such, inefficient utilization of available communication resources, particularly radiating overhead for cell power and resource management, may lead to degradations in wireless communication by causing interference for other cells. Even more, the foregoing inefficient resource utilization may inhibit network devices from achieving higher wireless communication quality. In view of the foregoing, it may be understood that there may be significant problems and shortcomings associated with current power and resource management technology. Thus, improvements in opportunistic small cell triggering are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for opportunistic small cell triggering comprises determining, by a user equipment (UE) connected to a cell, a change of location of the UE. Further, the method includes requesting small cell information from a database based at least in part on the change of location of the UE. Moreover, the method includes attempting to detect a small cell based on the small cell information. Additionally, the method includes transmitting a message to turn on the small cell when no the small cell is not detected.

Further aspects provide a computer program product for opportunistic small cell triggering comprising a computer-readable medium includes at least one instruction for determining, by a user equipment (UE) connected to a cell, a change of location of the UE. Further, the computer program product further comprises at least one instruction for requesting small cell information from a database based at least in part on the change of location of the UE. Moreover, computer program product further comprises at least one instruction for attempting to detect a small cell based on the small cell information. Additionally, the computer program product further comprises at least one instruction for transmitting a message to turn on the small cell when no the small cell is not detected.

Additional aspects provide an apparatus for communication comprises means for determining, by a user equipment (UE) connected to a cell, a change of location of the UE. The apparatus further comprises means for requesting small cell information from a database based at least in part on the change of location of the UE. Moreover, the apparatus comprises means for attempting to detect a small cell based on the small cell information. Additionally, the apparatus comprises means for transmitting a message to turn on the small cell when no the small cell is not detected.

In an additional aspect, an apparatus for communication comprises a memory storing executable instructions and a processor in communication with the memory, wherein the processor is configured to execute the instructions to determine, by a user equipment (UE) connected to a cell, a change of location of the UE. The processor is further configured to request small cell information from a database based at least in part on the change of location of the UE. Moreover, the processor is configured to attempt to detect a small cell based on the small cell information. Additionally, processor is configured to transmit a message to turn on the small cell when no the small cell is not detected.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
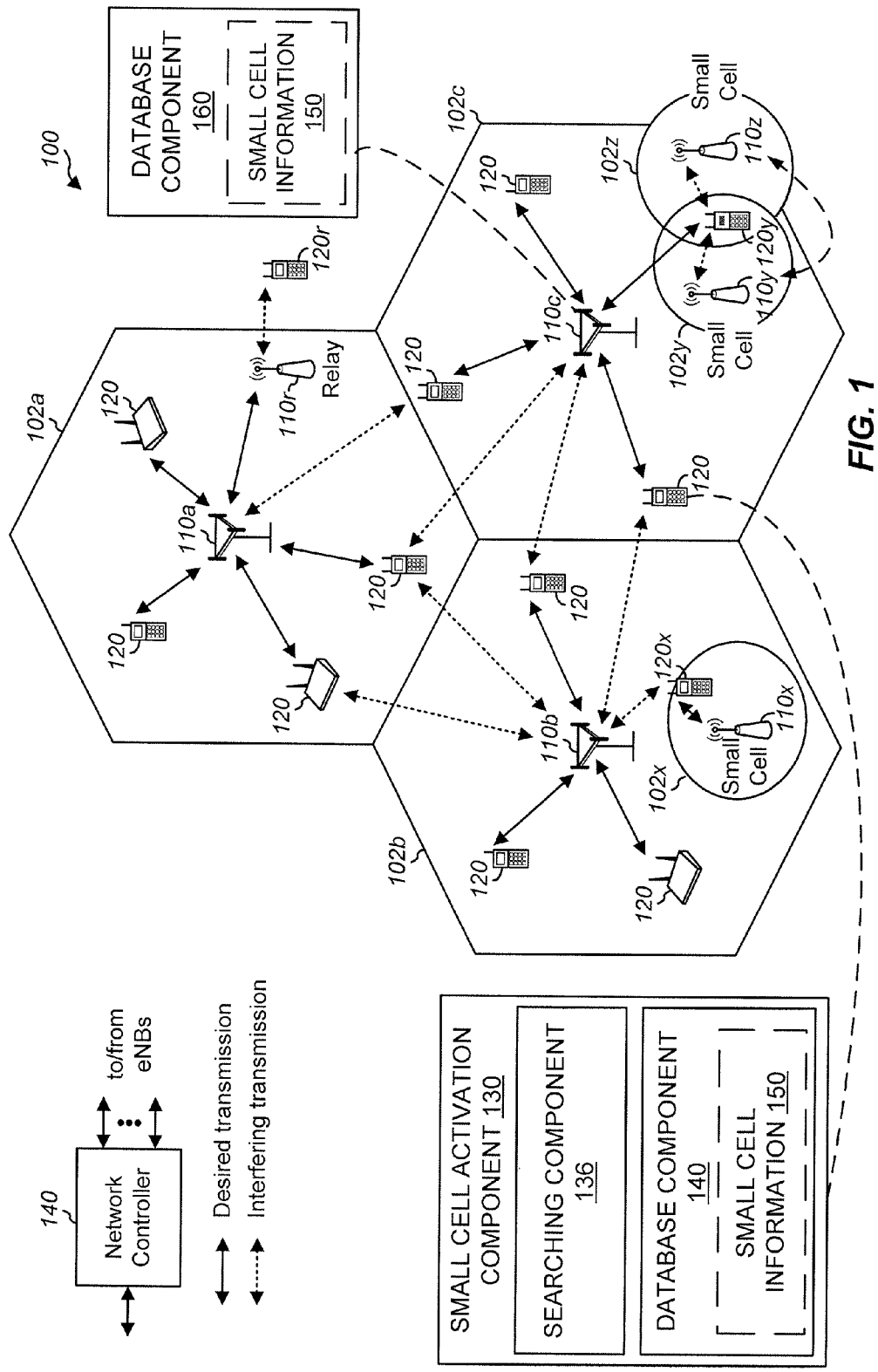
FIG. 1 is a block diagram conceptually illustrating an example of a telecommunications system in accordance with an aspect of the small cell activation component.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

The present aspects generally relate to opportunistic small cell triggering by a UE. Specifically, in some wireless communication systems, a UE may be configured by the network to connect to a cell in a network upon powering up and/or when changing locations. Further, small cells have been used to improve the capacity of data networks. However, small cells have smaller coverage areas since they have lower transmit power. Thus, there might be circumstances where a small cell (e.g., femto cell, pico cell, etc.) does not have any UEs within its coverage area, but it is still radiating overhead power. When this happens, needless interference may be added to UEs in macro cell coverage or other small cells in the vicinity. One current solution may be to use a method that relies upon what are called opportunistic small cells, in which the cell transmit power may be turned off for a majority of the time unless a UE is detected by the small cell. In this solution, a UE is detected by the small cell receiver through uplink Physical Random Access Channel (PRACH) preambles, which the UE transmits to the macro cell (e.g., the small cell detects the PRACH preambles by having its receiver turned on to listen for UEs, but has its transmitter turned off). However, this solution may be limited, as typically the small cell may be able to identify the uplink PRACH signature only on a subset of frequencies and only on a subset of radio standards (e.g., LTE, HSPA, etc.). That is, static power management and resource management procedures are utilized. As such, small cells may fail to obtain optimal manage of both power and resources during wireless communications.

Accordingly, in some aspects, the present methods and apparatus may provide an efficient and effective solution, as compared to current solutions, to enable a UE to trigger a small cell in its vicinity to "turn on" based on small cell information received and processed by the UE. In an aspect, the present apparatus and methods include querying one or more databases for small cell information based at least in part on detecting a change of location of the UE, and using the small information to trigger the small cell to turn on when the small cell would otherwise be turned off to avoid interfering with macro cells and/or other small cells.

The term "small cell," as used herein, refers to a relative low transmit power and/or a relatively small coverage area cell as compared to a transmit power and/or a coverage area of a macro cell. Further, the term "small cell" may include, but is not limited to, cells such as a femto cell, a pico cell, access point base stations, evolved Node Bs, Home NodeBs, femto access points, or femto cells. For instance, a macro cell may cover a relatively large geographic area, such as, but not limited to, several kilometers in radius. In contrast, a pico cell may cover a relatively small geographic area, such as, but not limited to, a building. Further, a femto cell also may cover a relatively small geographic area, such as, but not limited to, a home, or a floor of a building.

FIG. 1 is a block diagram conceptually illustrating an example of a telecommunications network system 100 in accordance with an aspect of the present disclosure. Telecommunications network system 100 may include one or more cells 110, for example, one or more evolved NodeBs (eNodeBs) and/or network entities. Each cell 110 may include database component 160, which may be configured to include small cell information 150.

In some aspects, the one or more small cells in the telecommunications network system 100 may communicate according to at least one technology such as, but not limited to, long term evolution (LTE), universal mobile telecommunications system (UMTS), code division multiple access (CDMA) 2000, wireless local area network (WLAN) (e.g., WiFi). Further, the transmission-related parameters associated with each of the one or more network entities, such as the foregoing non-limiting example network entities may include, but are not limited to, physical cell identity (PCI), primary synchronization code (PSC), pseudo-random noise code (PN), channel numbers and/or beacon patterns.

Moreover, for example, the telecommunications network system 100 may be an LTE network or some other wide wireless area network (WWAN). As such, the telecommunications network system 100 may include a number of eNodeBs 110, a number of UEs 120, and other network entities. Each of the eNodeBs 110 may include database component 160, and each of the UEs 120 may include small cell activation component 130 and be configured to perform an opportunistic small cell triggering procedure.

In certain aspects, small cell activation component 130 may include searching component 136 for searching a database component 140 for small cell information 150. For instance, small cell activation component 130 may be configured to determine, by a UE, such as UE 120, connected to a cell, such as eNodeB 110c, a change of location of UE 120. The small cell activation component 130 may also be configured to execute searching component 136 to request small cell information from database component 140 based at least in part on the change of location of UE 120. The small cell activation component 130 may be further configured to attempt to detect a small cell, such as small cell 110y, based on the small cell information 150. The attempt may involve having the small cell activation component 130 perform various functions in a repeated and/or continuous basis in order to try to detect the small cell. Moreover, the small cell activation component 130 may be configured to generate and transmit a message to turn on the small cell when the small cell is not detected as part of the attempts to detect the small cell. Additionally, in some aspects, small cell activation component 130 may be configured to execute searching component 136 to query database component 160 (e.g., a database not local to the UE 120) for the small cell information 150 in response to determining that the small cell information 150 was not found in database component 140.

An eNodeB 110 may be an example of a station that communicates with the UEs 120 and may also be referred to as a base station, an access point, etc. Each eNodeB 110 may provide communication coverage for a particular geographic area. In 3GPP, the term "cell" can refer to a coverage area of an eNodeB 110 and/or an eNodeB subsystem serving the coverage area, depending on the context in which the term is used.

An eNodeB 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 may be subscribed to a Closed Subscriber Group (CSG), UEs 120 for users in the home, etc.).

An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells. It should be understood that each of the eNodeBs may include small cell activation component 130.

The telecommunications network system 100 may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r.

The telecommunications network system 100 may be a heterogeneous network that includes eNodeBs 110 of different types, e.g., macro eNodeBs 110a-c, pico eNodeBs 110x, femto eNodeBs 110y-z, relays 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z (e.g., small cells 110x, 110y, and 110z) and relays 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 140 may be coupled to a set of eNodeBs 110 and provide coordination and control for these eNodeBs 110. The network controller 140 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
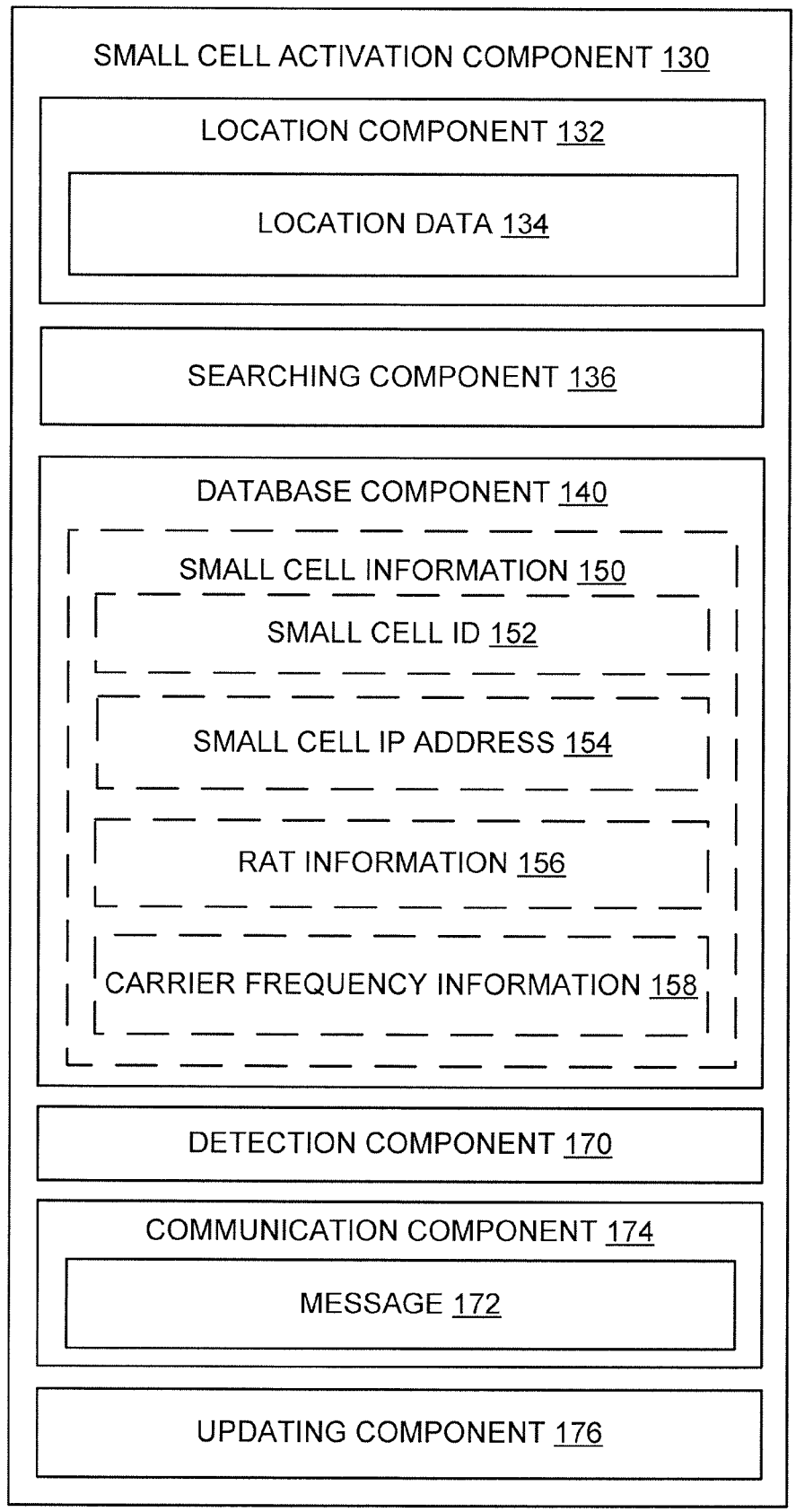
FIG. 2 is a schematic diagram of an aspect of the small cell activation component of FIG. 1.

Referring to FIG. 2, an aspect of the small cell activation component 130 may include various components and/or subcomponents, which may be configured to facilitate enhanced small cell triggering. For instance, small cell activation component 130 may improve small cell triggering by triggering a small cell in its vicinity to "turn on" based on small cell information. The various component/subcomponents described herein enable small cell activation component 130 to achieve such improved small cell triggering.

In an aspect, small cell activation component 130 may include a communication component 174. For instance, communication component 174 may be configured to connect to a cell, such as eNodeB 110c (FIG. 1). In some instance, communication component 174 may connect to the cell in response to UE 120 powering up (e.g., turning on) and/or changing locations (e.g., moving into the coverage area of another cell). Communication component 174 may be configured to perform a handover procedure and/or a cell switching procedure to connect to the cell. In addition, communication component 174 may be configured to communicate with one or more cells (eNodeBs 110) within the telecommunications network system 100.

Further, small cell activation component 130 may include location component 132. For instance, location component 132 may be configured to detect a change in location of the UE 120. In some aspects, location component 132 may detect a Global Position System (GPS) location of the UE 120. As a result, location component 132 may determine the change of location based at least in part on a difference between the GPS location and a previous GPS location. As such, location component 132 may store the change of location, or information indicative or representative of the change of location, as location data 134. In some instances, location component 132 may detect changes in location of the UE periodically or continuously, and may do so either manually (e.g., in response to user input) or automatically. Further, location component 132 may determine whether the change of location was greater than or equal to a change of location threshold value.

For instance, once UE 120 connects with a cell, such as eNodeB 110c (FIG. 1), in response to UE 120 powering up (e.g., turning on) and/or changing locations, location component 132 may be configured to periodically detect any changes in location of UE 120 based on the GPS location of UE 120. Other methods for determining location may be used herein, such as triangulation, multilateration of radio signals, etc. As a result of detecting the change of location, location component 132 may store the change of location as location data 134. Location component 132 may also detect changes in location of the UE based on readings from its onboard sensors (e.g., accelerometers, gyroscopes etc).

In a further aspect, small cell activation component 130 may include searching component 136. For instance, searching component 136 may be configured to search database component 140 for small cell information 150 based at least in part on the location data 134 (e.g., change of location of UE 120). In some instances, searching component 136 may be configured to search database component 140 for small cell information 150 based at least in part on the identity of the UE 120 in addition to location data 134. In an aspect, small cell information 150 corresponds to information of a small cell, such as small cell 110y (FIG. 1), within the vicinity of UE 120 as a result of the change of location of UE 120. In an instance, small cell information 150 may include small cell identification (ID) 152, small cell Internet Protocol (IP) address 154, Radio Access Technology (RAT) information 156, and carrier frequency information 158. Further, searching component 136 may search database component 140 for the small cell information 150 based at least in part on the location data 134 and/or the identity of UE 120.

In certain aspects, database component 140 may not have small cell information 150 stored within it. In this instance, small cell activation component 130 may execute searching component 136 to query database component 160 for small cell information 150. Database component 160 may be located at one or more eNodeBs 110 or on a known server on the internet. Further, communication component 174 may query database component 160 in response to database component 140 determining that the small cell information 150 was not found. In an instance, searching component 136 may transmit the location data 134 and/or the identity of UE 120 to database component 160. In response, searching component 136 may search for the small cell information 150 in database component 160 using the location data 134 and/or the identity of UE 120, and the results (e.g., small cell information 150) are transmitted back to searching component 136. If small cell information 150 was not found in either database component 140 and/or database component 160 then small cell activation component 130 may end the procedure and return to periodically detect any changes in location of UE 120.

In a further aspect, small cell activation component 130 may include detection component 170. For instance, detection component 170 may be configured to attempt to detect a small cell, such as small cell 110y (FIG. 1), based at least in part on the small cell information 150. In some instances, detection component 170 may search for the signal of the small cell on the specific carrier frequencies identified in carrier frequency information 158 of small cell information 150. Furthermore, detection component 170 may be configured attempt to detect the small cell based on the small cell ID 152, small cell IP address 154, and RAT information 156 in addition to the carrier frequency information 158.

In certain instances, communication component 174 may be configured to transmit message 172 to the small cell, such as small cell 110y (FIG. 1), when the small cell is not detected. For instance, UE 120 and/or small cell activation component 130 may determine that the small cell is turned off when detection component 170 cannot detect the small cell using the small cell information 150. As a result, communication component 174 may be configured to transmit message 172 to turn on the small cell. In some aspects, communication component 174 may transmit message 172 via the cell (e.g., eNodeB 110c in FIG. 1) using an Internet Protocol (IP) address of the small cell. In another aspect, communication component 174 may transmit message 172 via in band signaling in one or more frequencies within a frequency band of the small cell. In a further aspect, communication component 174 may transmit message 172 via out of band signaling in a one or more frequencies outside a frequency band of the small cell. In some instances, message 172 may comprise a Bluetooth low energy (BTLE) beacon, WiFi or any other type of beacon, when transmitted via out of band signaling. For example, the BTLE beacon may be transmitted via unlicensed spectrum (e.g., WiFi) that may be used to turn on the small cell.

Further, communication component 174 may be configured to connect with the small cell, such as small cell 110y (FIG. 1). If the small cell is initially detected by detection component 170, communication component 174 may perform a handover procedure and/or a cell switching procedure to connect to the small cell. In some instances, once message 172 is transmitted to turn on the small cell after the small cell cannot be detected by detection component 170, communication component 174 may then perform the handover procedure and/or the cell switching procedure to connect to the small cell after the small cell has been turned on.

In some instances, communication component 174 may be configured to disconnect with the small cell, such as small cell 110y (FIG. 1). For example, a small cell turn off message may be transmitted by communication component 174 if UE 120 leaves the coverage area of small cell 110y. In an aspect, communication component 174 may be configured to transmit 172 to turn off the small cell after UE 120 has successfully performed handover procedure and/or cell change from the small cell to a macro cell. In some instances, message 172 may comprise a Bluetooth low energy (BTLE) beacon, WiFi or any other type of beacon, when transmitted via out of band signaling. For example, the BTLE beacon may be transmitted via unlicensed spectrum (e.g., WiFi) that may be used to turn off the small cell.

In an additional aspect, activation component 130 may include updating component 176. For instance, updating component 176 may be configured to update at least one or both of database 140 and database 150 based at least in part on connecting to the small cell, such as small cell 110y (FIG. 1). In some aspects, updating component 176 may update the database with updated small cell information. In additional aspects, the updated small cell information may comprise information regarding whether the small cell was turned off or turned on. Additionally, updating component 176 may be configured to store the small cell information 150 in database component 140 if it was determined that the small cell information 150 was not found in database component 140, and subsequently received from database component 160.

Figure 3:
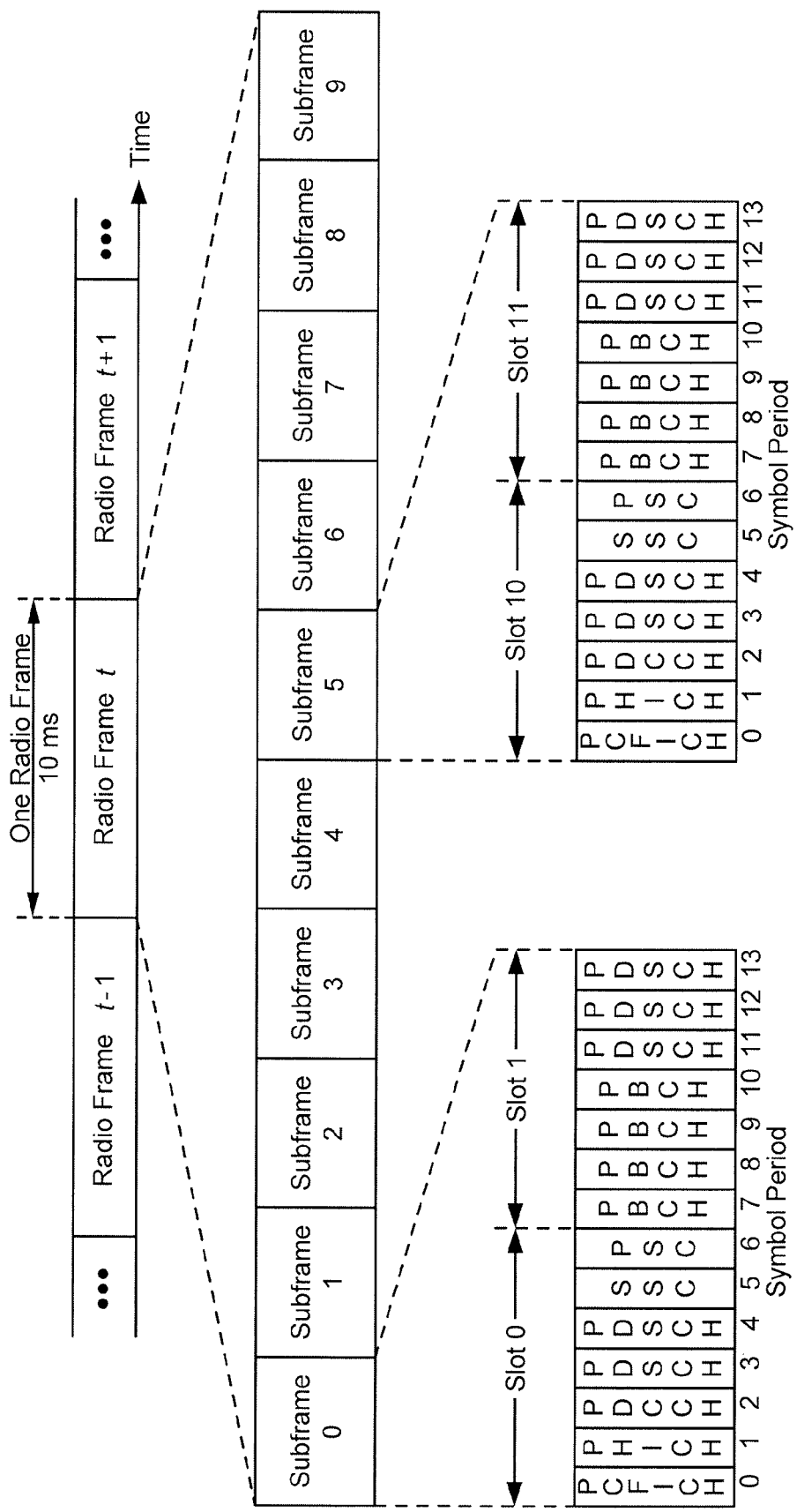
FIG. 3 is a block diagram conceptually illustrating an example of a downlink frame structure in a telecommunications system in accordance with an aspect of the present disclosure, e.g., according to FIG. 1.

FIG. 3 is a block diagram conceptually illustrating an example of a down link frame structure in a telecommunications system in accordance with an aspect of the present disclosure, including UE 120 (FIG. 1), which may include small cell activation component 130 and be configured to perform an opportunistic small cell triggering procedure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix (not shown). The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 3. The synchronization signals may be used by UEs for cell detection and acquisition. The eNodeB may send system information in a Physical Broadcast Channel (PBCH) in symbol periods 0 to 3 of slot 1 of sub-frame 0.

The eNodeB may send information in a Physical Control Format Indicator Channel (PCFICH) in only a portion of the first symbol period of each sub-frame, although depicted in the entire first symbol period in FIG. 3. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 3, the eNodeB may send information in a Physical HARQ Indicator Channel (PHICH) and a Physical Downlink Control Channel (PDCCH) in the first M symbol periods of each sub-frame (M=3 in FIG. 3). The PHICH may carry information to support hybrid automatic retransmission (HARQ). The PDCCH may carry information on uplink and downlink resource allocation for UEs and power control information for uplink channels. Although not shown in the first symbol period in FIG. 3, it may be understood that the PDCCH and PHICH are also included in the first symbol period.

Similarly, the PHICH and PDCCH are also both in the second and third symbol periods, although not shown that way in FIG. 3. The eNodeB may send information in a Physical Downlink Shared Channel (PDSCH) in the remaining symbol periods of each sub-frame. The PDSCH may carry data for UEs scheduled for data transmission on the downlink. Moreover, the small cell may be able to identify the uplink PRACH signature on a subset of frequencies and on a subset of radio standards, including High Speed Packet Access (HSPA).

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs. One of these eNodeBs may be selected to serve the UE. The serving eNodeB may be selected based on various criteria such as received power, path loss, signal-to-noise ratio (SNR), etc.

Figure 4:
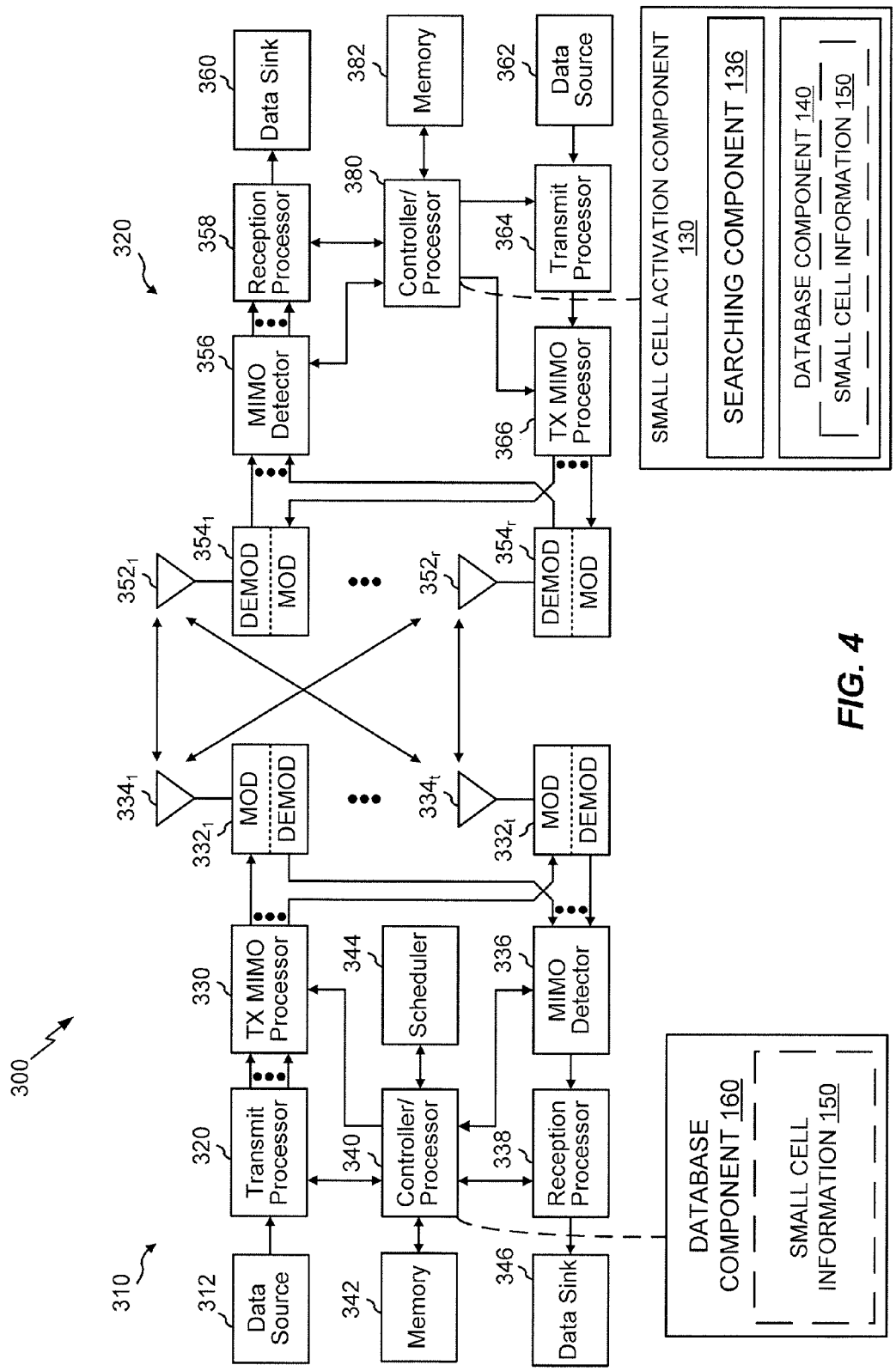
FIG. 4 is a block diagram conceptually illustrating an exemplary eNodeB and an exemplary UE configured in accordance with an aspect of the present disclosure, e.g., according to FIG. 1.

FIG. 4 is a block diagram conceptually illustrating an exemplary eNodeB 310 and an exemplary UE 320 configured in accordance with an aspect of the present disclosure. For example, the base station/eNodeB 310 and the UE 320, as shown in FIG. 3, may be one of the base stations/eNodeBs and one of the UEs in FIG. 1, including the UE 120 which may include small cell activation component 130. The base station 310 may be equipped with antennas $334_{1-t}$, and the UE 320 may be equipped with antennas $352_{1-r}$, wherein t and r are integers greater than or equal to one.

At the base station 310, a base station transmit processor 320 may receive data from a base station data source 312 and control information from a base station controller/processor 340, which may include database component 160 (FIG. 1). The control information may be carried on the PBCH, PCFICH, PHICH, PDCCH, etc. The data may be carried on the PDSCH, etc. The base station transmit processor 320 may process (e.g., encode and symbol map) the data and control information to obtain data symbols and control symbols, respectively. The base station transmit processor 320 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_{1-t}$. Each base station modulator/demodulator 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink signal. Downlink signals from modulators/demodulators $332_{1-t}$ may be transmitted via the antennas $334_{1-t}$, respectively.

At the UE 320, the UE antennas $352_{1-r}$ may receive the downlink signals from the base station 310 and may provide received signals to the UE modulators/demodulators (MODs/DEMODs) $354_{1-r}$, respectively. Each UE modulator/demodulator 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulators/demodulators $354_{1-r}$, and perform MIMO detection on the received symbols if applicable, and provide detected symbols. A UE reception processor 358 may process (e.g., demodulate, deinterleave, and decode) the detected symbols, provide decoded data for the UE 320 to a UE data sink 360, and provide decoded control information to a UE controller/processor 380, which may include small cell activation component 130 (FIG. 1).

On the uplink, at the UE 320, a UE transmit processor 364 may receive and process data (e.g., for the PUSCH) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE modulator/demodulators $354_{1-r}$ (e.g., for SC-FDM, etc.), and transmitted to the base station 310. At the base station 310, the uplink signals from the UE 320 may be received by the base station antennas 334, processed by the base station modulators/demodulators 332, detected by a base station MIMO detector 336 if applicable, and further processed by a base station reception processor 338 to obtain decoded data and control information sent by the UE 320. The base station reception processor 338 may provide the decoded data to a base station data sink 346 and the decoded control information to the base station controller/processor 340.

The base station controller/processor 340 and the UE controller/processor 380 may direct the operation at the base station 310 and the UE 320, respectively. The base station controller/processor 340 and/or other processors and modules at the base station 310 may perform or direct, e.g., the execution of various processes for the techniques described herein. The UE controller/processor 380 and/or other processors and modules at the UE 320 may also perform or direct, e.g., the execution of the functional blocks illustrated in FIGS. 6 and 7 and/or other processes for the techniques described herein. The base station memory 342 and the UE memory 382 may store data and program codes for the base station 310 and the UE 320, respectively. A scheduler 344 may schedule UEs 320 for data transmission on the downlink and/or uplink.

In one configuration, the base station 310 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the base station controller/processor 340, the base station memory 342, the base station transmit processor 320, the base station modulators/demodulators 332, and the base station antennas 334 configured to perform the functions recited by the aforementioned means. In another aspect, the aforementioned means may be a module or any apparatus configured to perform the functions recited by the aforementioned means.

In one configuration, the UE 320 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the UE controller/processor 380, the UE memory 382, the UE reception processor 358, the UE MIMO detector 356, the UE modulators/demodulators 354, and the UE antennas 352 configured to perform the functions recited by the aforementioned means. In another aspect, the aforementioned means may be a module or any apparatus configured to perform the functions recited by the aforementioned means.

Figure 5:
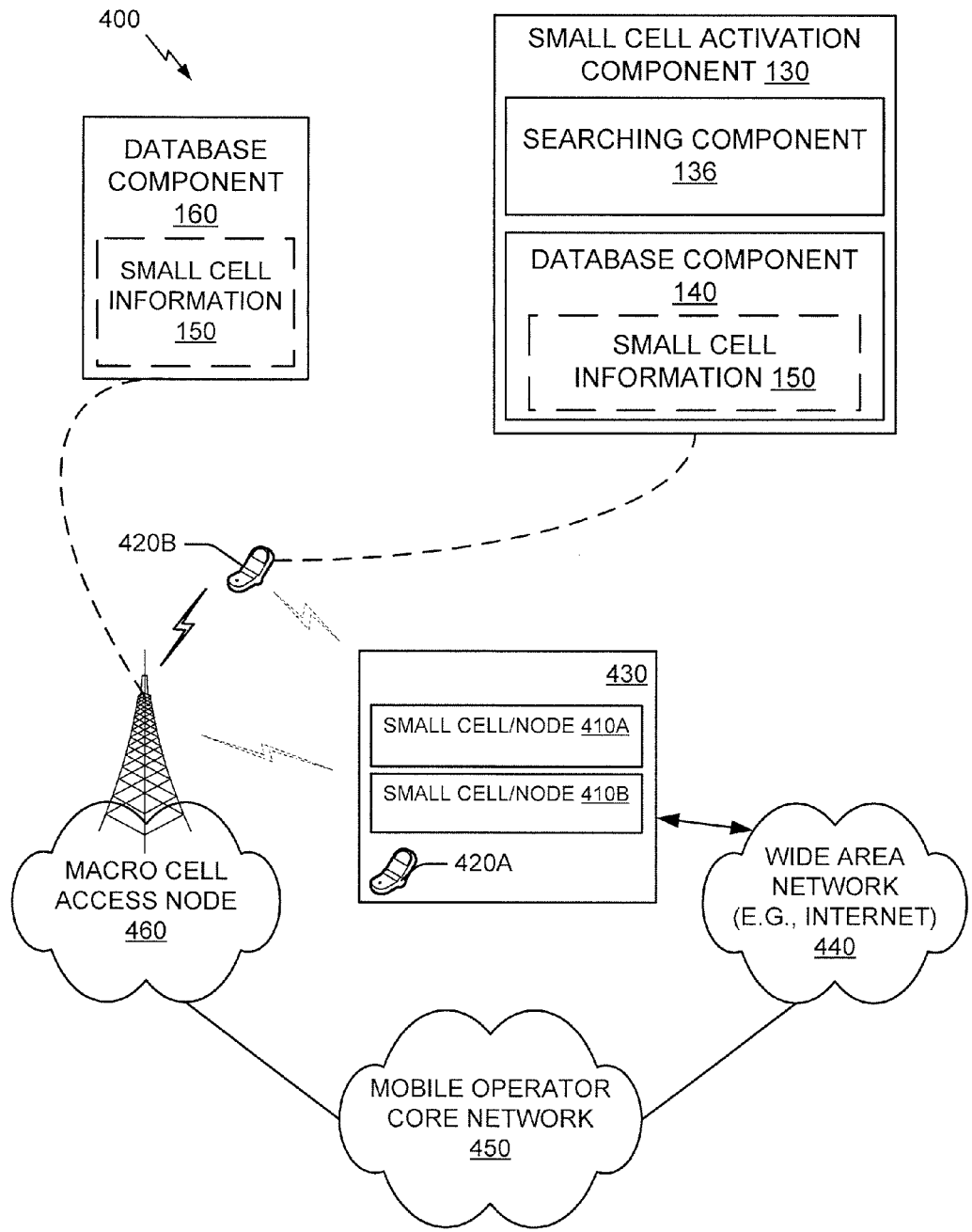
FIG. 5 illustrates an exemplary communication system to enable deployment of small cells/nodes and opportunistic small cell triggering within a network environment including an aspect of the user equipment described herein.

FIG. 5 illustrates an exemplary communications system 400 where one or more small cells are deployed within a network environment. The system 400 may be an example of portions of the telecommunications network system 100 described above with respect to FIG. 1. Specifically, the system 400 includes multiple small cells 410 (e.g., small cells or HNB 410A and 410B) installed in a relatively small scale network environment (e.g., in one or more user residences 430), wherein the small cells 410 may be the same as or similar to small cell 110y (FIG. 1). Each small cell 410 may be coupled to a wide area network 440 (e.g., the Internet) and a mobile operator core network 450 via a DSL router, a cable modem, a wireless link, or other connectivity means (not shown). As will be discussed below, each small cell 410 may be configured to serve associated access terminals 420 (e.g., access terminal 420A) and, optionally, alien access terminals 420 (e.g., access terminal 420B), both of which may be the same as or similar to UE 120 (FIG. 1), each of which may include small cell activation component 130 and configured to perform an opportunistic small cell triggering procedure. In other words, access to small cells 410 may be restricted whereby a given access terminal 420 may be served by a set of designated (e.g., home) small cell(s) 410 but may not be served by any non-designated small cells 410 (e.g., a neighbor's small cell 410). Further, access terminals 420 and each small cell 410 may communicate with macro cell access node 460, which may be the same or similar to eNodeBs 110 (FIG. 1), and which may include database component 160. Macro cell access node 460 may be coupled to mobile operator core network 450.

Figure 6:
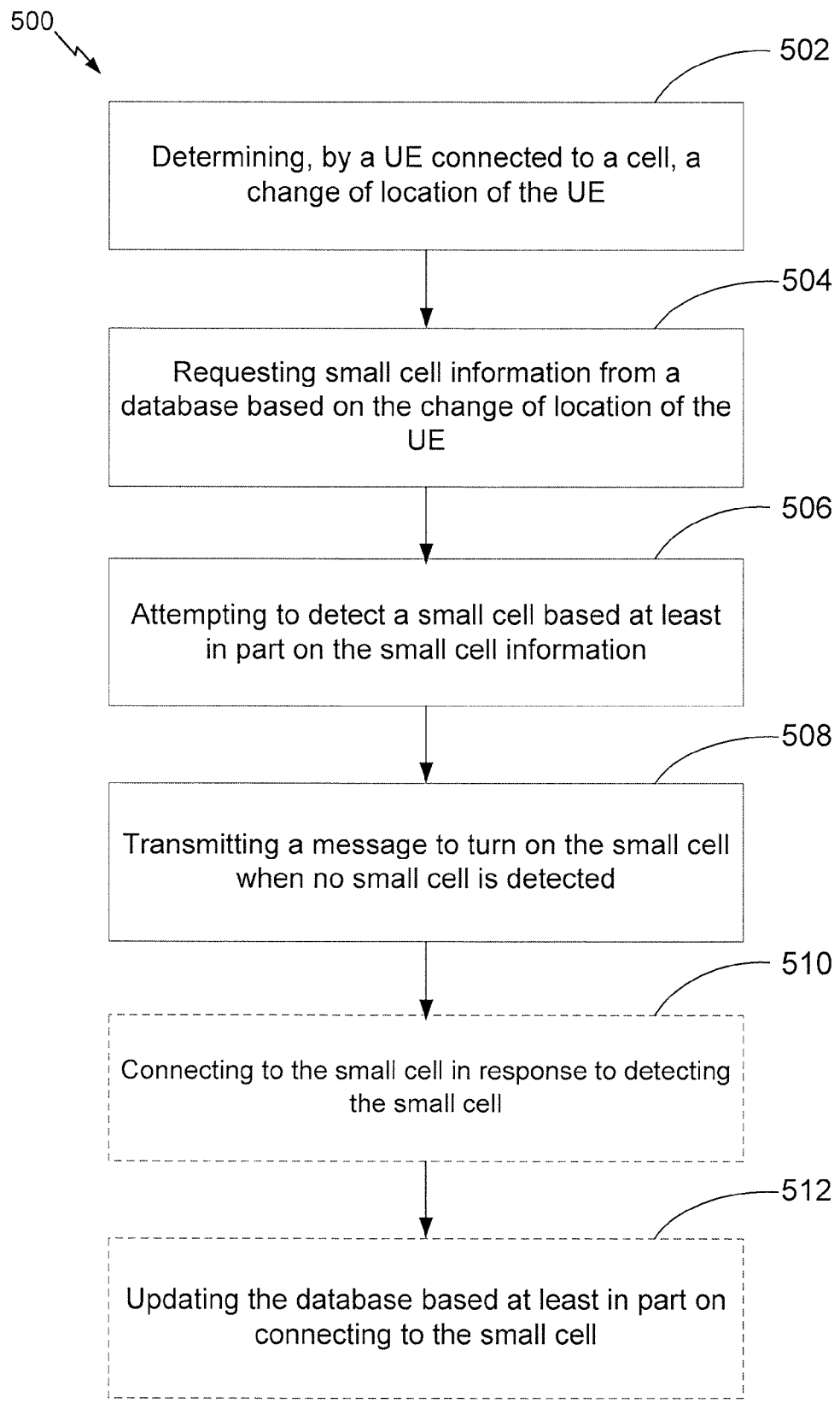
FIG. 6 is a flow chart illustrating a method for opportunistic small cell trigger, e.g., according to technology-related layer measurement component of FIG. 1.
Figure 7:
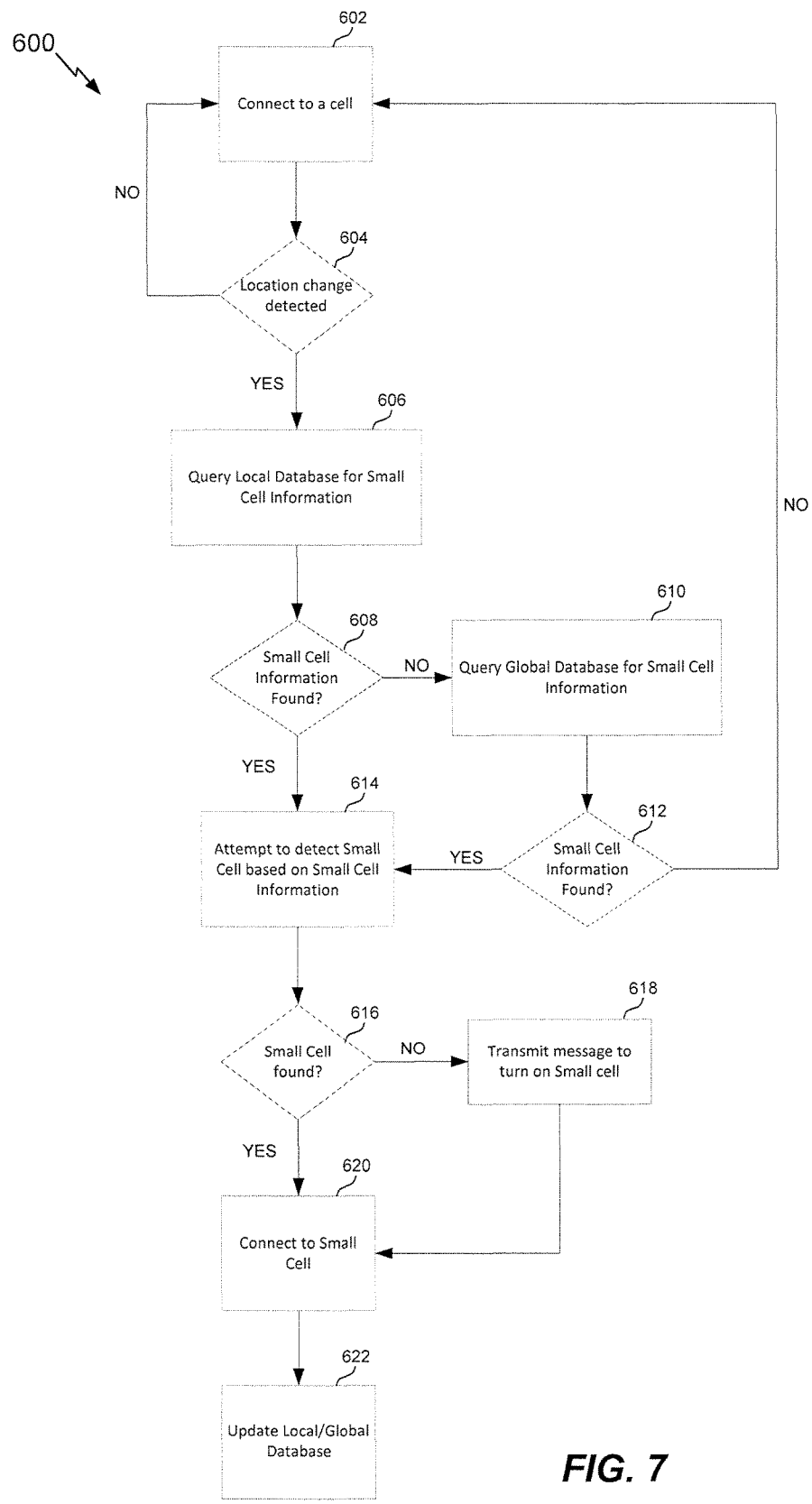
FIG. 7 is a flow chart illustrating another method for opportunistic small cell trigger, e.g., according to technology-related layer measurement component of FIG. 1.

Referring to FIGS. 6 and 7, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 6, in an operational aspect, a UE such as UE 120 (FIG. 1) may perform one aspect of a method 500 for opportunistic small cell triggering according to the small cell activation component 130 (FIG. 1). As described in further detail below, method 500 provides a process which may enhance small cell triggering by a UE (e.g., UE 120, FIG. 1).

In an aspect, at block 502, method 500 includes determining, by a UE connected to a cell, a change of location of the UE. For example, as described herein, small cell activation component 130 (FIG. 2) may execute location component 132 (FIG. 2) to determine a change of location of the UE 120. The change of location may be stored as location data 134 within location component 132.

At block 504, method 500 includes requesting small cell information from a database based on the change of location of the UE. For example, as described herein, small cell activation component 130 (FIG. 2) may execute searching component 136 (FIG. 2) to request small cell information 150 from database component 140 based on the change of location of the UE 120.

Further, at block 506, method 500 includes attempting to detect a small cell based at least in part on the small cell information. For example, as described herein, small cell activation component 130 (FIG. 2) may detection component 170 (FIG. 2) to attempt to detect a small cell, such as small cell 110y (FIG. 1) based at least in part on the small cell information.

Additionally, at block 508, method 500 includes transmitting a message to turn on the small cell when the small cell is not detected. For example, as described herein, small cell activation component 130 (FIG. 2) may execute communication component 174 (FIG. 2) to transmit a message to turn on the small cell, such as small cell 110y (FIG. 1) when no small cell is detected.

In some aspects, at block 510, method 500 optionally includes connecting to the small cell in response to detecting the small cell. For example, as described herein, small cell activation component 130 (FIG. 2) may execute communication component 174 (FIG. 2) to connect to the small cell, such as small cell 110y (FIG. 1), in response to detecting the small cell.

Moreover, at block 512, method 500 may optionally include updating the database based at least in part on connecting to the small cell. For example, as described herein, small cell activation component 130 (FIG. 2) may execute updating component 176 (FIG. 2) to update the database component 140 based at least in part on connecting to the small cell, such as small cell 110y (FIG. 1).

Referring to FIG. 7, in an operational aspect, a UE such as UE 120 (FIG. 1) may perform another aspect of a method 600 for opportunistic small cell triggering according to the small cell activation component 130 (FIG. 1). As described in further detail below, method 600 provides a process which may enhance small cell triggering by a UE (e.g., UE 120, FIG. 1).

In an aspect, at block 602, method 600 includes connecting to a cell. For example, as described herein, small cell activation component 130 (FIG. 2) may execute communication component 174 (FIG. 2) to connect to a cell (e.g., eNodeB 110c in FIG. 1). In some instances, communication component 174 may connect to the cell in response to UE 120 powering up (e.g., turning on) and/or changing locations.

At block 604, method 600 includes detecting a change in location of the UE. For example, as described herein, small cell activation component 130 (FIG. 2) may execute location component 132 (FIG. 2) to detect a change in location of the UE 120. In some aspects, location component 132 may detect a GPS location of the UE 120. As a result, location component 132 may determine the change of location based at least in part on a difference between the GPS location a previous GPS location. As such, location component 132 may store the change of location as location data 134. In some instances, location component 132 may detect changes in location of the UE periodically or continuously; and either manually or automatically. Further, location component 132 may determine whether the change of location was greater than or equal to a change of location threshold. If the change of location was less than the change of location threshold, then method 600 proceeds back to block 602. If the change of location was greater than or equal to the change of location threshold, then method 600 proceeds to block 606.

Further, at block 606, method 600 includes querying a local database for small cell information based at least in part on the change of location of the UE. For example, as described herein, small cell activation component 130 (FIG. 2) may execute searching component 136 (FIG. 2) to search database component 140 for small cell information 150. In some aspects, small cell information 150 may include small cell ID 152, small cell IP address 154, RAT information 156, and carrier frequency information 158. Further, searching component 136 may search database component 140 for the small cell information 150 based at least in part on the location data 134 and/or the identity of UE 120.

At block 608, method 600 includes determining whether small cell information was found. For example, as described herein, small cell activation component 130 (FIG. 2) may execute searching component 136 (FIG. 2) to determine whether small cell information 150 was found in database component 140. If small cell information 150 was found in database component 140, method 600 proceeds to block 614. If small cell information 150 was not found in database component 140, method 600 proceeds to block 610.

Moreover, at block 610, method 600 includes querying a global database for small cell information. For example, as described herein, small cell activation component 130 (FIG. 2) may execute searching component 136 (FIG. 2) to query database component 160, located at eNodeB 110c (FIG. 1), for small cell information 150. As noted above, small cell information 150 may include small cell ID 152, small cell IP address 154, RAT information 156, and carrier frequency information 158. Further, searching component 136 may transmit location data 134 and/or the identity of UE 120 to eNodeB 110c and/or database component 160.

At block 612, method 600 includes determining whether small cell information was found. For example, as described herein, small cell activation component 130 (FIG. 2) may execute searching component 136 (FIG. 2) to determine whether small cell information 150 was found. For instance, searching component 136 may receive a signal notifying whether small cell information 150 was found in database component 160. If small cell information 150 was found, method 600 proceeds to block 614. If small cell information 150 was not found in database component 160, method 600 proceeds back to block 602.

At block 614, method 600 includes attempting to detect a small cell based at least in part on the small cell information. For example, as described herein, small cell activation component 130 (FIG. 2) may execute detection component 170 (FIG. 2) to attempt to detect a small cell, such as small cell 110y (FIG. 1), based at least in part on the small information 150. In some instances, detection component 170 may search for the signal of the small cell on the specific carrier frequencies identified in carrier frequency information 158 of small cell information 150.

Further, at block 616, method 600 includes determining whether the small cell was found. For example, as described herein, small cell activation component 130 (FIG. 2) may execute detection component 140 (FIG. 2) to determine whether the small cell, such as small cell 110y (FIG. 1), was found. If the small cell was found, method 600 proceeds to block 620. In others aspects, if the small cell was not found, UE 120 may infer that small cell is turned off. As such, method 600 proceeds to block 618.

In some aspects, at block 618, method 600 includes transmitting a message to turn on the small cell. For example, as described herein, small cell activation component 130 (FIG. 2) may execute communication component 174 (FIG. 2) to transmit message 172 to the small cell, such as small cell 110y (FIG. 1) to turn on. In some aspects, communication component 174 may transmit message 172 via the cell (e.g., eNodeB 110c in FIG. 1) using an Internet Protocol (IP) address of the small cell. In another aspect, communication component 174 may transmit message 172 via in band signaling in one or more frequencies of the small cell. In a further aspect, communication component 174 may transmit message 172 via out of band signaling in a one or more frequencies outside one or more frequencies of the small cell. In some instances, message 172 may comprise a Bluetooth low energy (BTLE) beacon when transmitted via out of band signaling.

At block 620, method 600 includes connecting to the small cell. For example, as described herein, small cell activation component 130 (FIG. 2) may execute communication component 174 (FIG. 2) to connect to the small cell, such as small cell 110y (FIG. 1). If the small cell is detected (e.g., block 616), communication component 174 may perform a handover procedure and/or a cell switching procedure to connect to the small cell. In some instances, once message 172 is transmitted to turn on the small cell, communication component 174 may then perform the handover procedure and/or the cell switching procedure to connect to the small cell.

Additionally, at block 622, method 600 includes updating the local and/or global databases. For example, as described herein, small cell activation component 130 (FIG. 2) may execute updating component 176 (FIG. 2) to update at least one or both of database 140 and database 150 based at least in part on connecting to the small cell, such as small cell 110y (FIG. 1). In some aspects, updating component 176 may update the database with updated small cell information. In additional aspects, the updated small cell information may comprise information regarding whether the small cell was turned off or turned on.

Figure 8:
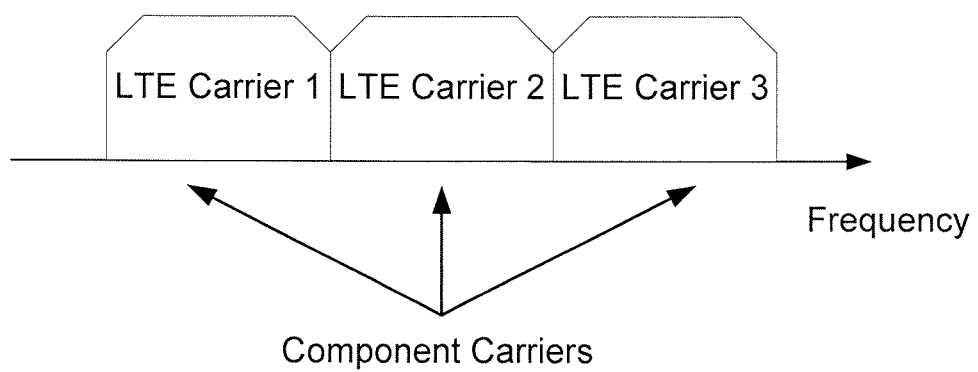
FIG. 8 illustrates a continuous carrier aggregation type in accordance with an aspect of the present disclosure, e.g., according to FIG. 1.
Figure 9:
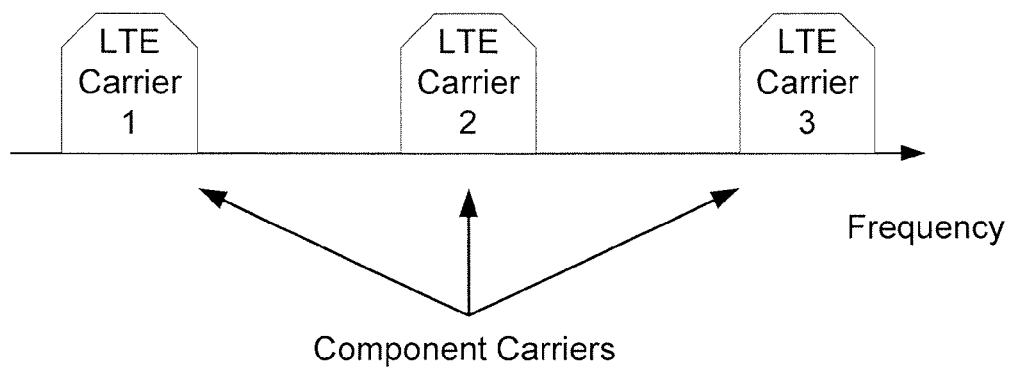
FIG. 9 illustrates a non-continuous carrier aggregation type in accordance with an aspect of the present disclosure, e.g., according to FIG. 1.

UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA, which are illustrated in FIGS. 8 and 9, respectively. Continuous CA occurs when multiple available component carriers are adjacent to each other (as illustrated in FIG. 8). On the other hand, non-continuous CA occurs when multiple non-adjacent available component carriers are separated along the frequency band (as illustrated in FIG. 9). It should be understood that any one or more network entities (e.g., eNodeBs), including network entity 102y, illustrated in FIG. 1 may communicate or facilitate communication according to the aspects set forth with regard to FIGS. 8 and 9.

Both non-continuous and continuous CA may aggregate multiple component carriers to serve a single unit of LTE-Advanced UEs. In various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support may be referred to as "associated secondary carriers." For example, the UE may aggregate control functions such as those provided by the optional dedicated channel (DCH), the nonscheduled grants, a physical uplink control channel (PUCCH), and/or a physical downlink control channel (PDCCH).

LTE-A standardization may require carriers to be backward-compatible, to enable a smooth transition to new releases. However, backward-compatibility may require the carriers to continuously transmit common reference signals (CRS), also may be referred to as (cell-specific reference signals) in every subframe across the bandwidth. Most cell site energy consumption may be caused by the power amplifier since the cell remains on even when only limited control signalling is being transmitted, causing the amplifier to continuously consume energy. CRS were introduced in release 8 of LTE standard and may be referred to as LTE's most basic downlink reference signal. For example, CRS may be transmitted in every resource block in the frequency domain and in every downlink subframe. CRS in a cell can be for one, two, or four corresponding antenna ports. CRS may be used by remote terminals to estimate channels for coherent demodulation. A new carrier type may allow temporarily switching off of cells by removing transmission of CRS in four out of five subframes. This reduces power consumed by the power amplifier. It also may reduce the overhead and interference from CRS since the CRS won't be continuously transmitted in every subframe across the bandwidth. In addition, the new carrier type may allow the downlink control channels to be operated using UE-specific demodulation reference symbols. The new carrier type might be operated as a kind of extension carrier along with another LTE/LTE-A carrier or alternatively as standalone non-backward compatible carrier.

Figure 10:
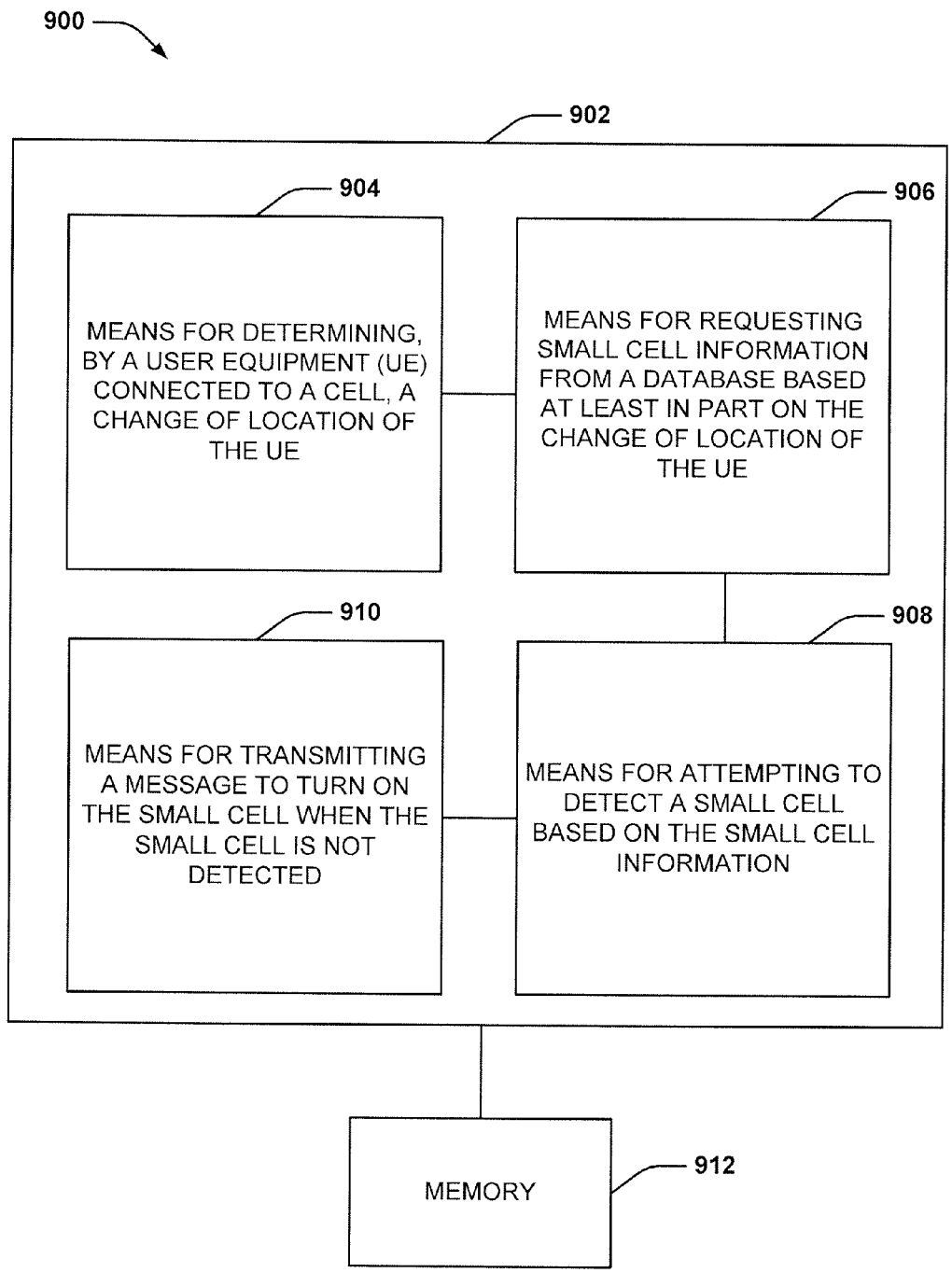
FIG. 10 illustrates a system for opportunistic small cell triggering in accordance with an aspect of the present disclosure, e.g., according to FIG. 1.

With reference to FIG. 10, illustrated is a system 900 for opportunistic small cell triggering by a user equipment. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of means that can act in conjunction. For instance, logical grouping 902 can include means for determining, by a user equipment (UE) connected to a cell, a change of location of the UE 904. Further, logical grouping 902 can comprise means for requesting small cell information from a database based at least in part on the change of location of the UE 906. Moreover, logical grouping 904 can comprise means for attempting to detect a small cell based on the small cell information 908. Additionally, logical grouping 904 can comprise means for transmitting a message to turn on the small cell when the small cell is not detected. Thus, as described, the UE attaches to a small cell based on opportunistic small cell triggering. Additionally, system 900 can include a memory 912 that retains instructions for executing functions associated with the means 904, 906, 098, and 910. While shown as being external to memory 912, it is to be understood that one or more of the means 904 and 906 can exist within memory 912.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communications, comprising:
   determining, by a user equipment (UE) connected to a cell, a change of location of the UE;
   requesting, by the UE, small cell information from a database based at least in part on the change of location of the UE, wherein the small cell information corresponds to information relating to a small cell within a vicinity of the UE as a result of the change of location of the UE;
   attempting, by the UE, to detect the small cell based on the small cell information;
   transmitting a message to turn on the small cell when the small cell is not detected;
   connecting to the small cell when the small cell is detected in response to the message being transmitted;
   updating the database based at least in part on connecting to the small cell, wherein updating the database comprises providing updated small cell information to the database;
   determining the UE leaves a coverage area of the small cell; and
   transmitting a second message to turn off at least a transmitter of the small cell based at least in part on determining the UE leaves the coverage area of the small cell.

2. The method of claim 1, wherein connecting to the small cell comprises one or both of performing a handover procedure or performing a cell switching procedure.

3. The method of claim 1, wherein the updated small cell information comprises information regarding whether the small cell was turned off or turned on.

4. The method of claim 1, wherein transmitting the message comprises transmitting the message via any existing cell and addressing the small cell using an Internet Protocol (IP) address of the small cell.

5. The method of claim 1, wherein transmitting the message comprises transmitting the message via in band signaling in one or more frequencies of a frequency band of the small cell.

6. The method of claim 1, wherein transmitting the message comprises transmitting the message via out of band signaling in a one or more frequencies outside a frequency band of the small cell.

7. The method of claim 6, wherein the message comprises at least one or both of a Bluetooth low energy (BTLE) beacon and a wireless local area network (WLAN) beacon.

8. The method of claim 1, wherein the small cell information comprises one or more of an identification (ID) of the small cell, an IP address of the small cell, radio access technology (RAT) information, or carrier frequency information.

9. The method of claim 1, wherein requesting the small cell information from the database further comprises:
   querying a local database for the small cell information; and
   querying a global database for the small cell information when the small cell information is not found within the local database.

10. The method of claim 9, wherein the local database is located within the UE.

11. The method of claim 9, wherein the global database is located at one or both of a network entity and an internet server.

12. The method of claim 1, wherein the cell comprises at least one or both of a macro cell or an initial small cell.

13. The method of claim 1, wherein determining the change of location of the UE comprises:
   detecting a global positioning system (GPS) location of the UE; and
   determining the change of location based at least in part on a difference between the GPS location a previous GPS location.

14. The method of claim 13, wherein requesting the small cell information from the database further comprises requesting the small cell information from the database in response to determining that the change of location of the UE is greater than or equal to a change of location threshold.

15. A non-transitory computer-readable medium storing computer executable code, comprising:
   code for determining, by a user equipment (UE) connected to a cell, a change of location of the UE;
   code for requesting, by the UE, small cell information from a database based at least in part on the change of location of the UE, wherein the small cell information corresponds to information relating to a small cell within a vicinity of the UE as a result of the change of location of the UE;
   code for attempting to detect, by the UE, the small cell based on the small cell information;
   code for transmitting a message to turn on the small cell when the small cell is not detected;
   code for connecting to the small cell when the small cell is detected in response to the message being transmitted;
   code for updating the database based at least in part on connecting to the small cell, wherein updating the database comprises providing updated small cell information to the database;
   code for determining the UE leaves a coverage area of the small cell; and
   code for transmitting a second message to turn off at least a transmitter of the small cell based at least in part on determining the UE leaves the coverage area of the small cell.

16. An apparatus for communication, comprising:
   means for determining, by a user equipment (UE) connected to a cell, a change of location of the UE;
   means for requesting, by the UE, small cell information from a database based at least in part on the change of location of the UE, wherein the small cell information corresponds to information of a small cell within a vicinity of the UE as a result of the change of location of the UE;
   means for attempting to detect, by the UE, the small cell based on the small cell information;
   means for transmitting a message to turn on the small cell when the small cell is not detected;
   means for connecting to the small cell when the small cell is detected in response to the message being transmitted;

means for updating the database based at least in part on connecting to the small cell, wherein updating the database comprises providing updated small cell information to the database;

means for determining the UE leaves a coverage area of the small cell; and means for transmitting a second message to turn off at least a transmitter of the small cell based at least in part on determining the UE leaves the coverage area of the small cell.

17. An apparatus for communication, comprising:

a memory configured to store instructions; and a processor coupled to the memory, wherein the processor is configured to execute the instructions in the memory to:

determine, by a user equipment (UE) connected to a cell, a change of location of the UE;

request, by the UE, small cell information from a database based at least in part on the change of location of the UE, wherein the small cell information corresponds to information relating to a small cell within a vicinity of the UE as a result of the change of location of the UE;

attempt to detect, by the UE, the small cell based on the small cell information;

transmit a message to turn on the small cell when the small cell is not detected;

connect to the small cell when the small cell is detected in response to the message being transmitted;

update the database based at least in part on connecting to the small cell, wherein updating the database comprises providing updated small cell information to the database;

determine the UE leaves a coverage area of the small cell; and transmit a second message to turn off at least a transmitter of the small cell based at least in part on determining the UE leaves the coverage area of the small cell.

18. The apparatus of claim 17, wherein connecting to the small cell comprises one or both of performing a handover procedure or performing a cell switching procedure.

19. The apparatus of claim 17, wherein the updated small cell information comprises information regarding whether the small cell was turned off or turned on.

20. The apparatus of claim 17, wherein transmitting the message comprises transmitting the message via at least one or more of any existing cell or addressing the small cell using an Internet Protocol (IP) address of the small cell, in band signaling in one or more frequencies of a frequency band of the small cell, out of band signaling in a one or more frequencies outside a frequency band of the small cell comprising at least one or both of a Bluetooth low energy (BTLE) beacon and a wireless local area network (WLAN) beacon.

21. The apparatus of claim 17, wherein the small cell information comprises one or more of an identification (ID) of the small cell, an IP address of the small cell, radio access technology (RAT) information, or carrier frequency information.

22. The apparatus of claim 17, wherein requesting the small cell information from the database further comprises:

querying a local database for the small cell information; and querying a global database for the small cell information when the small cell information is not found within the local database, wherein the local database is located within the UE, and the global database is located at one or both of a network entity and an internet server.

23. The apparatus of claim 17, wherein the cell comprises at least one or both of a macro cell or an initial small cell.

24. The apparatus of claim 17, wherein determining the change of location of the UE comprises:

detecting a global positioning system (GPS) location of the UE; and determining the change of location based at least in part on a difference between the GPS location a previous GPS location, wherein requesting the small cell information from the database further comprises requesting the small cell information from the database in response to determining that the change of location of the UE is greater than or equal to a change of location threshold.

* * * * *